United States Patent [19]

Krumboltz et al.

[11] 3,905,035

[45] Sept. 9, 1975

[54] ELECTRONIC COUNTERMEASURE SYSTEM

[75] Inventors: Howard D. Krumboltz, Oreland; Clayton W. Merrill, Wilmerding, both of Pa.

[73] Assignee: The United States of America as represented by the Secretary of the Navy, Washington, D.C.

[22] Filed: Mar. 31, 1966

[21] Appl. No.: 540,158

[52] U.S. Cl.......... 343/6.5 R; 343/6.8 R; 343/18 E
[51] Int. Cl.²........................ G01S 9/56; H04K 3/00
[58] Field of Search............. 343/6.5, 6.8, 18, 6.5 R, 343/6.8 R, 18 E, 6.5 LC, 6.8 LC

[56] References Cited
UNITED STATES PATENTS
3,025,516   3/1962   Bickler.............................. 343/6.5

Primary Examiner—Malcolm F. Hubler
Attorney, Agent, or Firm—G. J. Rubens; Henry Hansen

[57] ABSTRACT

An electronic countermeasure apparatus for deceiving an IFF system into identifying an aircraft hostile to an interrogator as friendly by intercepting and imitating responding IFF signals from aircraft identified as friendly by the interrogator and responding to an interrogation with an imitated signal of that intercepted from the friendly aircraft.

16 Claims, 13 Drawing Figures

INVENTORS
HOWARD D. KRUMBOLTZ
CLAYTON W. MERRILL

By *Henry Hansen*

ATTORNEY

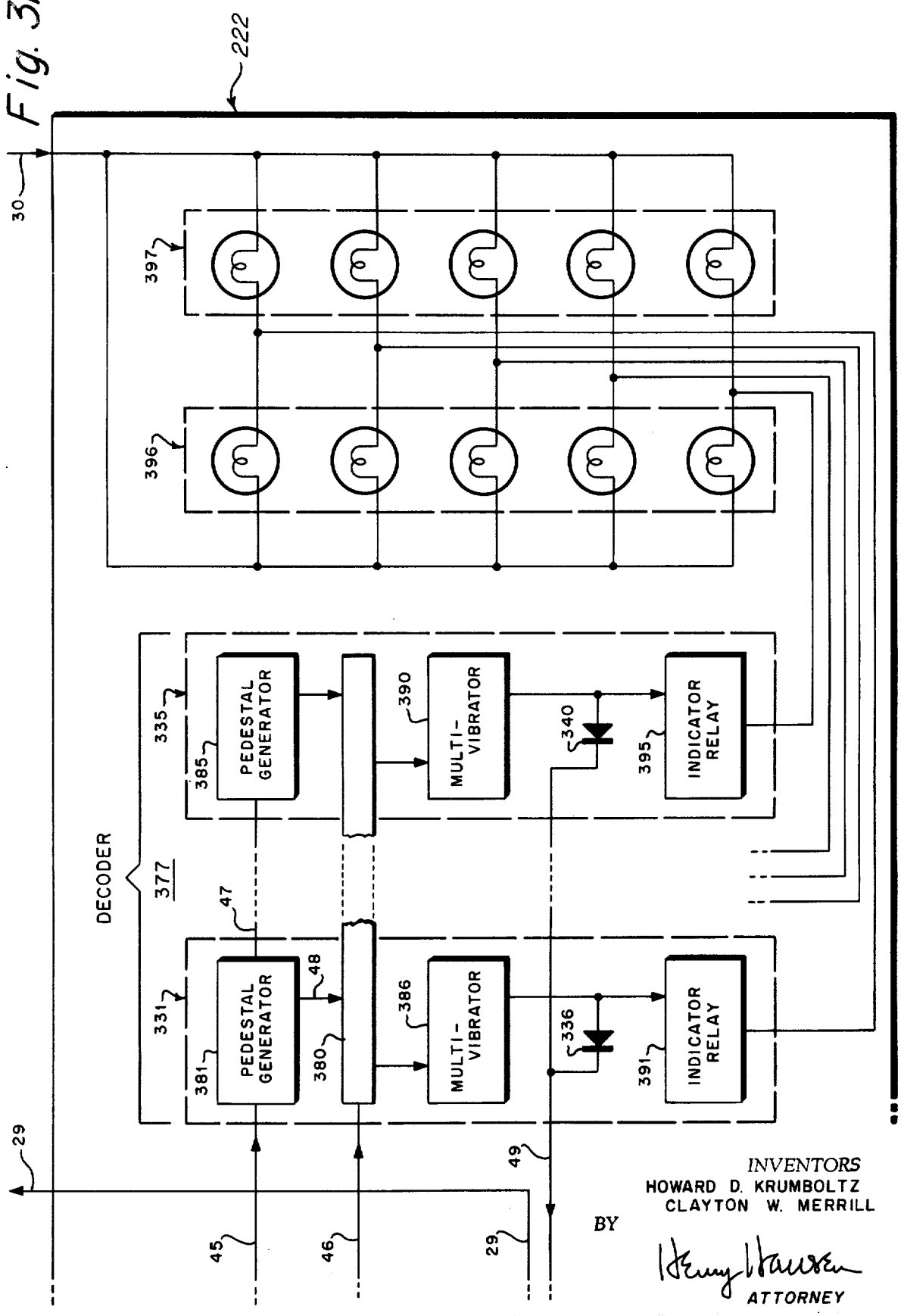

INVENTORS
HOWARD D. KRUMBOLTZ
CLAYTON W. MERRILL

ATTORNEY 3,905,035

ELECTRONIC COUNTERMEASURE SYSTEM

The invention described herein may be manufactured and used by or for the Government of the United States of America for governmental purposes without the payment of any royalties thereon or therefor.

The present invention relates to systems for identification of aircraft and more particularly to an electronic countermeasure system for a foe aircraft flying into an environment hostile thereto, and capable of intercepting and imitating responding IFF signals from aircraft identified as friendly by the interrogator station whereby the foe aircraft is identified deceivingly as friendly to the hostile environment.

In the field of aircraft identification, it has been the general practice to transmit an interrogation signal to an aircraft requesting that the aircraft identify itself as friend or foe (IFF). Since the interrogation signal is transmitted on a particular frequency, and only a friendly aircraft to the interrogation station would be aware of this frequency, any aircraft hostile to this environment would be unable to identify itself upon an interrogation signal being transmitted thereto. Additionally, even if the hostile aircraft was able to receive the interrogation signal, it would not necessarily know what the proper response would be to identify itself as a friendly aircraft. Accordingly, the interrogation station would immediately take corrective action to either identify the aircraft by some other means or to intercept and destroy the aircraft by use of either missiles or other projectiles.

In an effort to deceive the interrogation station into identifying a hostile aircraft as a friendly aircraft, and thereby allow the hostile aircraft to penetrate deeper into the friendly territory before being identified, it has been the general practice of the hostile aircraft to employ repeater stations to deceive and confuse a functioning interrogation system by providing false target indications. While such systems have performed their mission with a certain degree of success, they are incapable of responding to interrogation signals which require a predetermined coded response for proper identification. Accordingly, such systems fail to confuse or deceive an interrogation station and immediate evasive action would be taken by the interrogation station to either further identify the aircraft or to destroy it.

Those concerned with the development of electronic countermeasure means have long recognized the need for an airborne system which can intercept and decode a response by a friendly aircraft to its interrogation signal, and imitate this response in reply to an interrogation signal so that an interrogation station would be deceived into identifying a foe aircraft equipped with such a system as a friendly aircraft to the environment, when in fact the foe aircraft is attempting to penetrate deeply into the friendly territory before being discovered.

Accordingly, the general purpose of the present invention is to fulfill this need by providing an airborne electronic countermeasure system (ECM) for receiving or intercepting another aircraft's coded reply to an interrogation signal, decoding this signal and transmitting a duplicate coded reply upon being interrogated, thereby causing an interrogation station to be deceived into identifying the aircraft equipped with the ECM system as friendly to the hostile environment.

An object of the present invention is to provide an ECM system for receiving and decoding another aircraft's coded reply to interrogation and to transmit a duplicate coded reply upon interrogation.

Another object is to deceive an interrogation station into identifying an unfriendly aircraft as friendly to the environment thereby allowing the aircraft to penetrate deeper into the environment before being correctly identified.

A further object of the invention is to provide means for receiving another aircraft's response to an interrogation signal and to provide means for decoding and displaying the responsive code.

A still further object of the invention is to scan a frequency range for interrogation signals and transmit in response thereto a signal which is the duplicate of a coded reply made by another aircraft.

Yet another object of the invention is to provide warning means to the operator of an aircraft of the presence of an interrogating signal.

Other objects and many of the attendant advantages of this invention will be readily appreciated as the same becomes better understood by reference to the following detailed description when considered in connection with the accompanying drawings in which:

FIGS. 3a and 3b illustrate in more detailed block diagram form the receiver-decoder portion of the radar system;

The present invention provides for the first time an airborne electronic countermeasures system capable of intercepting and imitating IFF signals in a hostile environment into which an aircraft is flying and thereby be identified as friendly in the hostile environment.

Figure 1A:
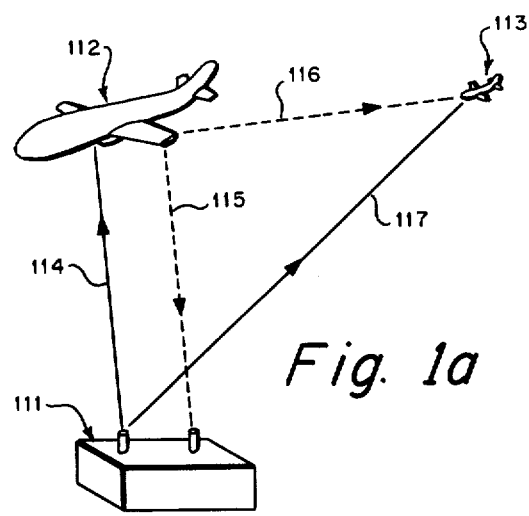
FIGS. 1a and 1b illustrate the basic modes of operation of a specific embodiment of the invention.
Figure 1B:
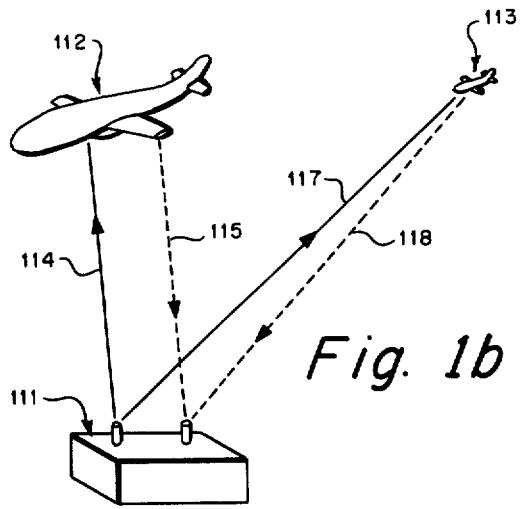

Referring now to the drawings, there is shown in FIG. 1 a specific embodiment of the present invention which illustrates the basic modes of operation of a radar IFF system. FIG. 1a, for example, illustrates an interrogation station 111, which for purposes of illustration will be located in a hostile environment, for example, in enemy territory. An aircraft 112 friendly to the hostile environment is shown flying over the interrogation station 111. A second aircraft 113 which is hostile to the enemy territory, is attempting to enter the hostile environment. Aircraft 113 is equipped with the ECM system of the present invention.

An interrogation signal 114 is transmitted to the friendly aircraft 112 by the interrogation station 111 requesting that the aircraft identify itself as friend or foe. In response to this interrogation, aircraft 112 responds with a predetermined coded message generally indicated as 115 to the interrogation station thereby identifying itself as a friendly aircraft. The same coded message which is transmitted by aircraft 112 to the interrogator 111 is also received by aircraft 113 via a transmission path 116.

Upon receiving the response signal of the friendly aircraft 112, aircraft 113 proceeds to decode the response signal so as to determine what reply is necessary at the interrogation station 111 to be identified as a friendly aircraft.

During the same interval of time in which aircraft 112 is being interrogated, or shortly thereafter, an interrogation signal 117 is transmitted to the aircraft 113 requesting that the aircraft identify itself as friend or foe. Aircraft 113 will then switch to the transmit mode of operation and reply to the ground interrogator 111 with a coded response 118 acquired from aircraft 112. In this manner the interrogation station 111 will erroneously identify the aircraft 113 as a friendly aircraft and accordingly will not take corrective action.

Figure 2:
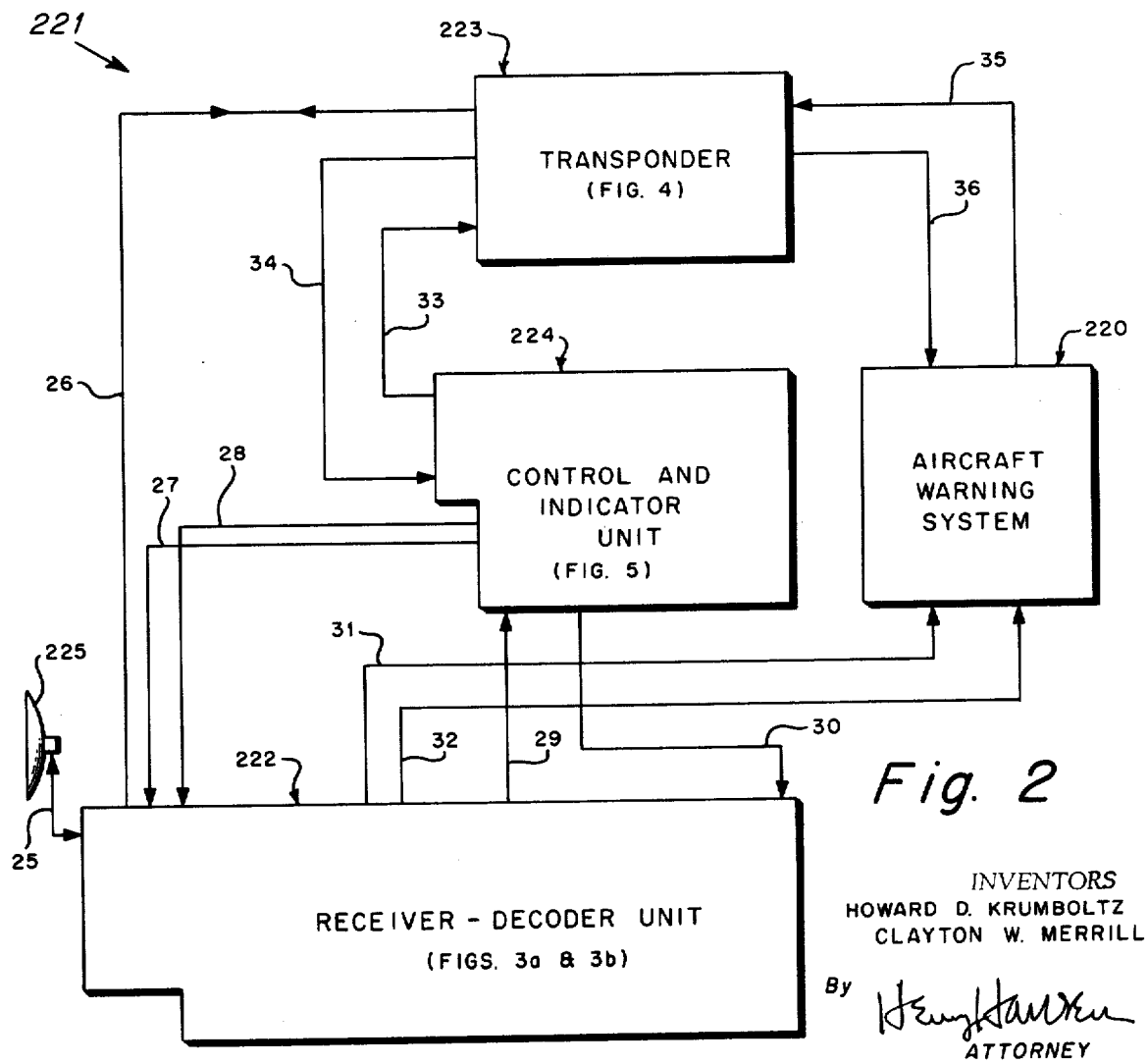
FIG. 2 illustrates in block diagram form the overall radar system.

A better understanding of how the present invention achieves the aforementioned results will become apparent from a description of the overall block diagram of the ECM system shown in FIG. 2.

FIG. 2 illustrates an embodiment of an airborne ECM radar system 221 comprising a receiver-decoder unit 222, a transponder unit 223, a control and indicator unit 224 and an aircraft's warning system 220.

Basically, the ECM radar system has two modes of operation: a receive mode, in which the receiver-decoder unit 222 receives and decodes the pulse width of coded RF signals and displays these decoded signals in the control and indicator unit 224, and, a transmit mode in which the transponder unit 223 receives the interrogation and transmits a coded reply which has been preset by the control and indicator unit 224.

The two modes of operation are not operable at the same time and control and indicator unit 224 exercises complete control over the transponder unit 223 and the receiver-decoder unit 222 thereby establishing the two operating modes. Interrogation signals are received by the receiver-decoder unit 222 in a common antenna 225 and according to the operating mode selected, is coupled to the receiver-decoder unit 222 or the transponder unit 223 through a two-position coaxial switch located in the receiver-decoder unit 222 referred to hereinafter in conjunction with the description of FIG. 3.

The receiver-decoder unit 222 has conductors 25 through 32 extending therefrom; conductor 25 engages the antenna 225, conductor 26 engages transponder unit 223, conductors 27 through 30 engage the control unit and indicator unit 24 and conductors 31 and 32 engage the aircraft warning system 220. Transponder unit 223 has conductors 33 and 34 engaging the control and indicator unit 224 and conductors 35 and 36 engage the aircraft warning system 220. The conductors 26 through 36 consist of a plurality of separately insulated conductors, each carrying signals between the respective units, as will be explained hereinafter.

In the receive mode of operation, the signals received from the antenna 225 pass through the coaxial switch (as will be explained hereinafter) to the receiver-decoder unit 222. The receiver-decoder unit scans the frequency band automatically or manually and decodes the signal. A visual display of the decoded signal is supplied by indicator lights on the control and indicator unit 224 in combination with a frequency indication on a meter described hereinafter. The indicator lights enable the operator to visually decode the pulse width coding of an interrogation signal and establish a duplicate sequential pulse width coding with switches located on the control and indicator unit 224. In addition to the indicator lights, the receiver-decoder unit 222 provides an audio output through conductor 31 for the aircraft warning system to assist in pulse decoding and as a warning of interrogation reception. A video output signal coupled to the aircraft warning system through conductor 32 is also available for use in pulse repetition measurement and wave shape examination.

In the transmit mode of operation, the signals from the antenna 225 pass through the coaxial switch to the transponder unit 223. The transponder automatically scans the frequency range and duplicates and transmits the coded reply which has been preset on the control and indicator unit 224. The reply may be made by either of two methods; namely, interrogation or "squitter". The normal reply method, interrogation, involves transponder operation where the transponder 223 receives an interrogation signal and transmits a reply. The second method, "aquitter", is accomplished by preflight adjustment of the transponder 223 to transmit a reply at a random or semi-random pulse repetition rate as a function of the surrounding noise. The transponder unit 223 also yields an audio output to the aircraft warning system through conductor 36 for audible indication of interrogation and reply activity for monitoring purposes. The transponder unit 223 also receives a suppression signal from the aircraft warning system through conductor 35 to prevent the transponder from firing on signals from other radar or equipment in the aircraft system.

Figure 3A:
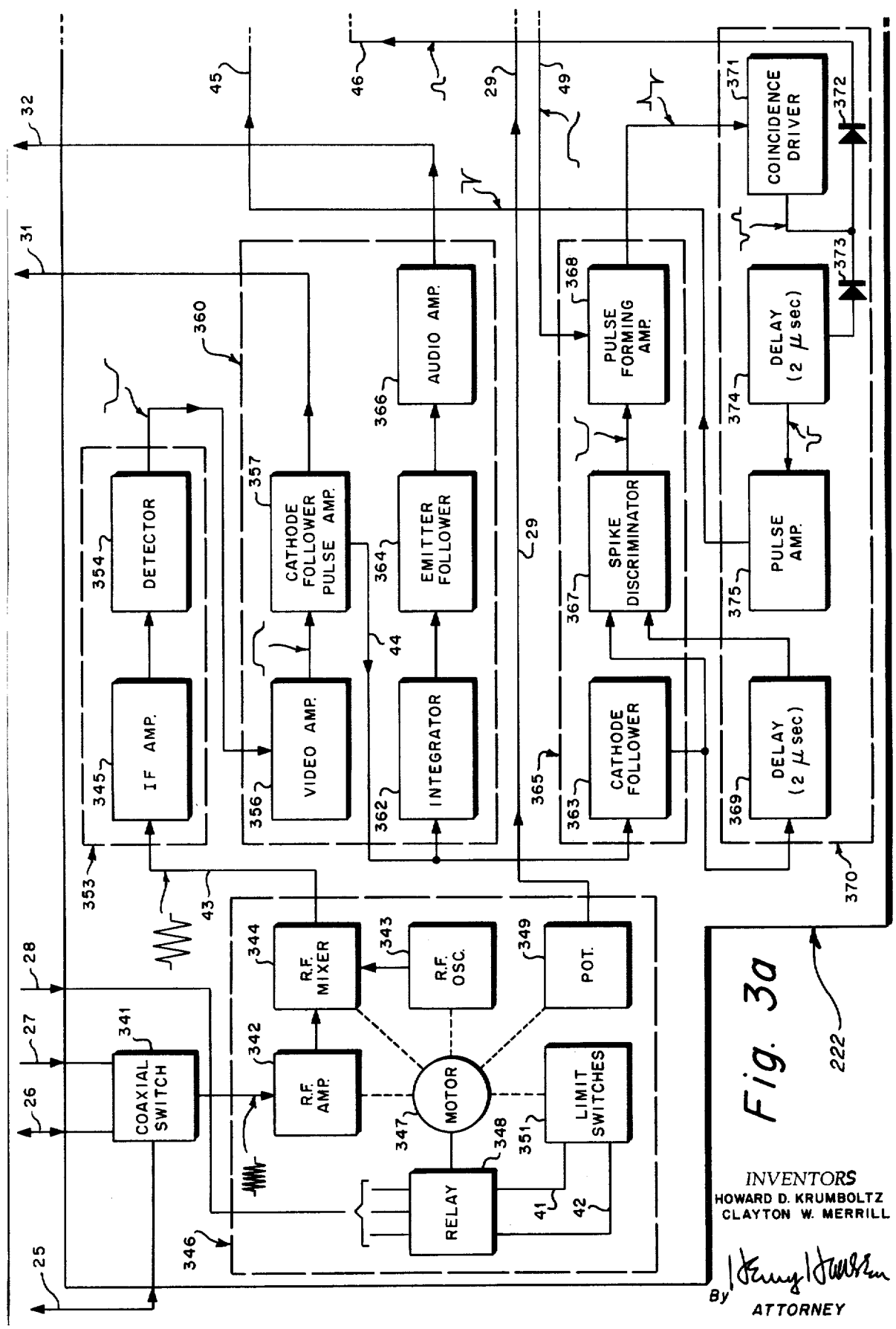

The receiver-decoder unit 222 illustrated in FIG. 2 in block diagram form will now be described in greater detail with reference to FIGS. 3a and 3b.

The receiver-decoder unit 222 scans a predetermined frequency band for possible interrogation signals and the received RF signal from antenna 225 is passed through a coaxial cable 25 to a coaxial switch 341 to an RF amplifier 342. The coaxial switch 341 is actuated by a signal through the conductor 27 from the control and indicator unit 224 (hereinafter described) so as to pass the received signal to the RF amplifier 342 during the receive mode of operation. RF amplifier 342 is typically a grounded-grid cascode amplifier providing adequate RF gain throughout the desired frequency band of the incoming signal. An RF oscillator 343 having an appropriate output frequency is coupled to an RF mixer 344 so as to produce an intermediate frequency output which is passed to an IF amplifier 345. For example, assume that the desired frequency band of the signal to be received is 153 to 175 megacycles. In this case then the RF amplifier 342 would be adjusted to provide sufficient gain over this bandwidth and the RF oscillator 343 would be operating at a frequency 30 megacycles below the incoming signal so as to produce an intermediate frequency signal of 30 megacycles which is passed to the IF amplifier 345.

The RF amplifier and tuning drive chassis 346 scans the RF range through the operation of a motor 347 which is controlled by energizing a plurality of motor relays 348 from the control and indicator unit 24 through conductors indicated generally as 28. The motor relays 348 are typically high current power-type relays which control the direction of rotation of the motor 347 so as to cause the RF amplifier 342, the RF mixer 344, and the RF oscillator 343 to be tuned across the frequency band in synchronization. A potentiometer 349 driven by the motor supplies a voltage through a conductor 29 to a meter in the control and indicator unit 224 for displaying the frequency of the received signal as a function of motor position. The function of the meter will be described in greater detail in connection with the description of the control and indicator unit 224. A pair of limit switches generally referred to as 351 are connected to relays 348 through conductors 41 and 42 so as to remove power from the motor 347 when the motor reaches the extremities of its rotation thereby eliminating the possibility of damaging the motor as a result of trying to drive it beyond its normal position.

The output signal from the RF mixer 344 is coupled to the IF amplifier 345 of the IF amplifier chassis 353 by a conductor 43. The IF amplifier 345 is typically a six-stage IF amplifier but may be of any appropriate design so long as it provides sufficient gain and bandwidth at the particular intermediate frequency. Typical designs for IF amplifiers can be found in Principles of Radar, 3rd edition, by Reintjes and Cote, McGraw Hill Book Co., 1952, or the Massachusetts Institute of Technology Radiation Laboratory Series of Vacuum Tube Amplifiers, Vo. 18 by Valley and Wallman, published by McGraw-Hill Book Co., Inc. 1948. The output of IF amplifier 345 is coupled to a detector 354 which detects the output signal from the amplifier and produces a negative-going pulse of signal characteristics equivalent to the received signal.

The output of the detector 354 is coupled to a video amplifier 356 which forms a part of an amplifier chassis 360. The video amplifier 356 (shown in detail in FIG. 6 and described hereinafter) amplifies and inverts the detected signal from detector 354. The output signal from the video amplifier 356 is coupled to a cathode follower 357 which provides impedance transformation of the output signal. The cathode follower 357 has two identical outputs 31 and 44. Output 31 is coupled to the aircraft warning system as an externally available video signal for test and pulse observation. Output 44 is coupled to an integrator 362 and to another cathode follower 363 which forms a part of the pulse forming amplifier and spike discriminator chassis 365.

The integrator 362 is typically a capacitive integrator with a diode input so as to provide a fast charging time constant and to allow only the positive portions of the waveform from the cathode follower 357 to pass into the integrating capacitor, thereby eliminating any negative-going signals as a result of pulse overshoot from passing into the capacitor. The output of the integrator 362 is then coupled to an emitter follower 364 which in conjunction with the integrator 362 stretch the amplified pulse and then apply it to an audio amplifier 366. The output of the audio amplifier is coupled to the aircraft's warning system 220 through a conductor 32 to provide an output signal for continuous wave (CW) signal detection and as an aid in decoding transponder signals by the squitter method discussed previously and to be described in greater detail hereinafter.

Output 44 from cathode follower 357 which has been connected to the cathode follower 363 is used to actuate a spike discriminator 367 and a delay line 369.

The purpose of the spike discriminator 367 is to reject pulses narrower than a prescribed pulse width and differentiate acceptable pulses. For example, the spike discriminator 367 may be adjusted to reject pulses narrower than 2 microseconds and differentiate any pulses wider than 2 microseconds. The operation is best described by use of the following example.

Figure 8B:
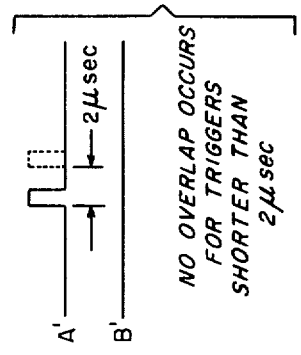
FIGS. 8a and 8b illustrate typical waveforms related to the spike discriminator in the specific embodiment.
Figure 8A:
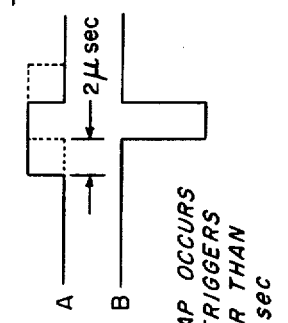

If the output of the cathode follower 363 is a pulse narrower than 2 microseconds, the spike discriminator 367 will yield no output. On the other hand, if the output from the cathode follower 363 is a pulse wider than 2 microseconds, then the spike discriminator 367 will produce a negative going output pulse (as shown), the duration of which is a function of the input pulse width to the spike discriminator from the cathode follower 363 and the amount of delay established in a delay line 369. Spike discriminator 367 functions similar to an AND gate in which two simultaneous inputs are required before an output will issue therefrom. Typically, the spike discriminator may be a pentode amplifier tube (not shown) in which the output from the cathode follower 363 is connected to the suppressor grid and the output from the delay line 369 is connected to the control grid. The pulse and bias levels of the pentode are then adjusted so that no plate-cathode current will flow upon the application of only a single pulse from either input. However, if the pulse applied to the suppressor grid of the spike discriminator 367 is longer than 2 microseconds, then after a delay period of 2 microseconds as established by delay line 369, overlap will occur and as a consequence thereof plate-cathode current will flow. In this case the plate circuit, which is also the output of the spike discriminator, will go negative for as long as the grid and suppressor pulses overlap. This action is shown ideally in FIGS. 8*a* and 8*b*. FIG. 8*a*, line A illustrates two partially coincident pulses, the first of which is applied to the suppressor grid of the spike discriminator 367 and the second of which (the delay pulse) is applied to the control grid of the spike discriminator. The two microsecond difference appearing between the initiation of each pulse is a result of the delay line 369 which delays the output of the cathode follower 2 microseconds and then applies it to the control grid of the spike discriminator 367. During the overlap period, as illustrated in line B of FIG. 8*a*, an output pulse is generated the duration of which is a function of the overlap between the two pulses. FIG. 8*b* line A' illustrates the condition in which the output pulse from the cathode follower 363 is of a duration shorter than 2 microseconds and as a result thereof the two pulses applied to the spike discriminator in the manner aforementioned, fail to overlap during any portion of their wave shape and accordingly no output pulse will be generated. This condition is shown in line B' of FIG. 8b.

Assuming for the moment that the output pulse from the cathode follower 363 is of sufficient pulse width to cause an overlap in the spike discriminator 367 and accordingly produce a negative going output pulse, this pulse is then applied to a pulse forming amplifier 368, the primary purpose of which is to invert and differentiate the output of the spike discriminator 367. By inverting and differentiating the pulse, a positive spike is formed at the leading-edge and a negative spike at the trailing-edge. The time between the leading and trailing edges is variable, depending upon the original pulse width (or code). The pulse forming amplifier 368 can be considered to be a normally conducting triode type tube (not shown) which upon application of the negative pulse from the spike discriminator 367 will develop a large positive pulse which is then differentiated by resistive, capacitive or inductive means to achieve the general wave shape shown in FIG. 3a.

The output of the pulse forming amplifier 368 is then coupled to the input of a coincidence driver amplifier 371 which passes both the positive and negative pulses received from the pulse forming amplifier 368. The coincidence driver 371 accepts the leading edge of the input pulse and produces a negative-going one microsecond pulse followed by a positive-going one microsecond pulse corresponding to the trailing edge of the input signal. These two pulses as illustrated in FIG. 3a are coupled to selector diodes 372 and 373 which are poled in such a manner as to pass only one portion of the output wave shape from the coincidence driver 371. Specifically, diode 372 will pass the positive portion of the wave while diode 73 will pass the negative portion of the wave. The negative pulse is passed through diode 373 to a delay line 374 which for purposes of illustration has a two microsecond delay time to prevent the equipment from decoding any pulses less than four microseconds wide; therefore, the additional delay of 2 microseconds which is established by delay unit 374 in addition to the 2 microsecond delay established by unit 369 provide the 4 microsecond delay necessary to prevent decoding of pulses less than 4 microseconds wide. The output of the delay unit 374 is coupled to a pulse amplifier 375 which provides amplification without inversion of the pulse. Accordingly, the output from the pulse amplifier 375 is a negative-going pulse which is coupled through conductor 45 to a first pedestal generator 381, to be described hereinafter.

The positive-going trailing-edge pulse from the coincidence driver 371 is coupled to a coincidence bus 380 through selector diode 372 and a conductor 46.

A decoder section 377 is used to actuate a plurality of indicator lights so as to enable the operator to visually decode the pulse width codes of a number of pulses involved in an interrogation cycle. The decoder section is composed of five identical units 331 through 335 each respectively containing a pedestal generator 381 through 385, a multivibrator 386 through 390, an indicator relay 391 through 395 and lockout diodes 336 through 340.

Figure 7:
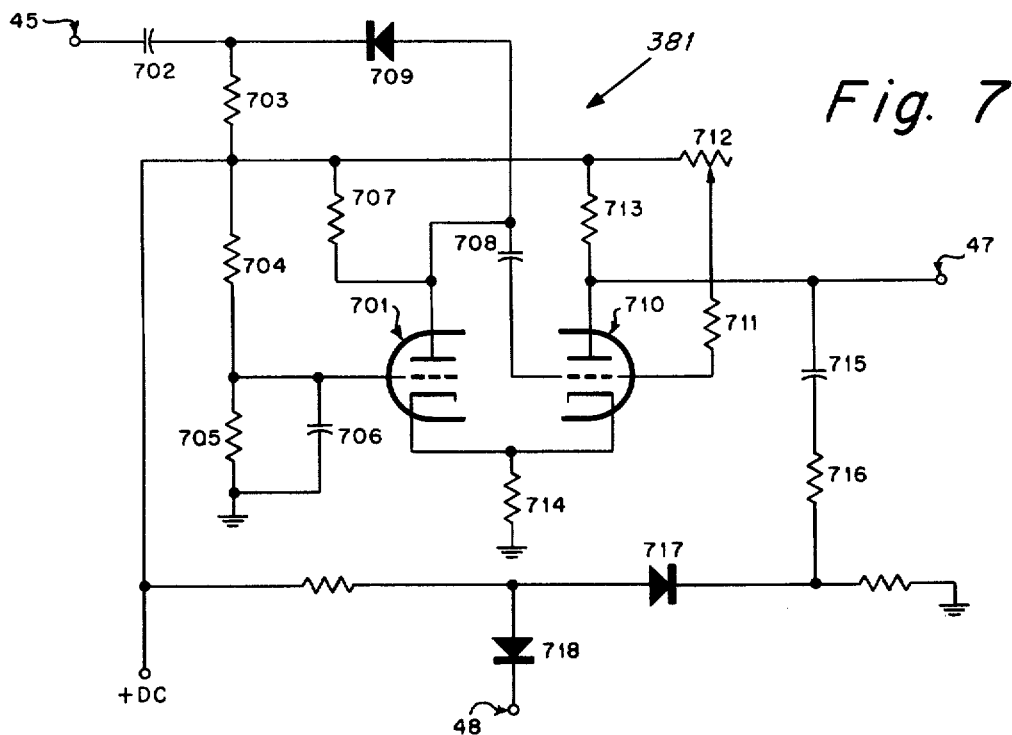
FIG. 7 is a schematic diagram of the pedestal generator.

The construction and operation of the pedestal generator 381 will now be described with reference to FIG. 7. The output signal from the pulse amplifier 375 is coupled to the input of the pedestal generator 381 through a capacitor 702 and resistors 703 and 704 to the grid of a triode tube 701. The control grid of the triode 701 also has a resistor 705 and a capacitor 706 attached thereto and to a ground reference; the plate electrode is connected to a resistor 707 and then to the junction of resistors 703 and 704 which is attached to a source of positive d.c. voltage. The plate electrode of the triode 701 is also connected to one electrode of a capacitor 708, the other end of which is connected to the control grid of a second triode tube 710; the plate electrode is also coupled through a diode 709 to the junction of elements 702 and 703. The control electrode is also connected to one end of a fixed resistor 711, the other end of which is connected to the movable arm on a rheostat 712, the fixed end of which is connected to the source of d.c. voltage. The plate electrode of triode 710 is also connected through a resistor 713 to the source of d.c. voltage. The cathodes of both triodes 701 and 710 are connected together and through a resistor 714 to a ground reference. In the normal quiescent state, triode 710 is conducting very heavily. Upon application of a negative input pulse to capacitor 702 from the pulse amplifier 375, the triode 710 is cut off and the triode 701 is turned on with a resultant positive pulse appearing at the plate electrode of triode 701. The duration of the positive pulse is determined by the pulse width control (resistor 712), resistor 711, and capacitor 708. A portion of the output of pedestal generator 381 is fed to the coincidence bus 380 and then to the miltivibrator 386 through a divider network comprising a capacitor 715, resistor 716, diode 717 and diode 718. The output pulse derived from the plate electrode of triode 710 is coupled directly to the input circuit of pedestal generator 382 through a conductor 47. The multivibrator 386 controls the opening and closing of indicator relay 391 by actuating the control winding.

The operation of the decoder section 377 will now be described in greater detail. The negative-going output pulse from pulse amplifier 375 causes triode 710 to cut off and triode 701 to conduct causing a positive pulse to be generated on the plate electrode of triode 710. This pulse is coupled through the divider network to the coincidence gate through a conductor 48 and also directly to the input of the succeeding pedestal generator circuit 382. In pedestal generator 382 the positive-going pulse is differentiated by capacitor 702 and resistor 703. The negative portion or the trailing-edge of the pulse is used to trigger the triode 710 into the nonconducting state. As a pulse is generated in each succeeding generator, identical action occurs throughout the five units. Therefore, after initiating operation of pedestal generator 381 by the leading-edge of a trigger pulse, a series of five sequential gates (pedestals) are generated, each adjustable in width within a given range. Typical pedestal widths which may be used in the specific embodiment disclosed herein are shown in the following table:

| Code No. | Total Delay (Microseconds) |
| --- | --- |
| 1 | 5 to 15 |
| 2 | 15 to 30 |
| 3 | 30 to 50 |
| 4 | 50 to 70 |
| 5 | 70 to 120 |

From the coincidence bus 380, the positive portion of the separated trigger pulse (trailing-edge of output pulse from coincidence driver 371) appears at the cathode of diode 718. Depending on the width of the trigger, the positive portion (trailing-edge) will appear in time within one of the five gates (pedestals) that are generated. When coincidence occurs, a positive pulse appears at the input of one of the multivibrators 386 through 390 which are normally conducting, causing this section of the multivibrator to go towards cut-off and in turn causing the other section to conduct heavily. The indicator relay 391 (assuming coincidence occurs at the input of multivibrator 386) is connected in the cathode return of the portion of the multivibrator 386 which is normally off and when actuated, as just described, causes the indicator relay 391 to close its contacts and thereby energize the appropriate indicator lights on indicator panels 396 and 397. For convenience, indicator panel 396 may be located in the pilot's control area and indicator panel 397 located in the control and indicator unit 224.

Diodes 336 through 340 of the decoder section are used to disable (lock out) the decoder section when one of the multivibrators 386 through 390 is operating. In other words, if other signals arriving during the time in which one indicator lamp is illuminated, were allowed to pass through the decoder, other lights would also glow and cause confusion to the operator. Accordingly, the lock-out circuit permits time spacing between indicator light illumination and thereby assures that only one indicator lamp is illuminated at a time. The lock-out signal is derived from the positive pulse existing on the cathode which is connected to the indicator relay 391 when it is decoding. This signal passes through diode 336 to a lock-out bus 49. All five decoder sections are similarly connected to the lock-out bus which is coupled back to the pulse forming amplifier 368 so as to inhibit the amplifier from producing any outputs to drive the coincidence driver 371 until the signal from the multivibrator ends.

While the operation has been described with reference to a single pulse, the system could function equally well with a train of pulses thereby causing the indicator lights to repeat their lighting sequence at the pulse repetition rate of the system.

Figure 4:
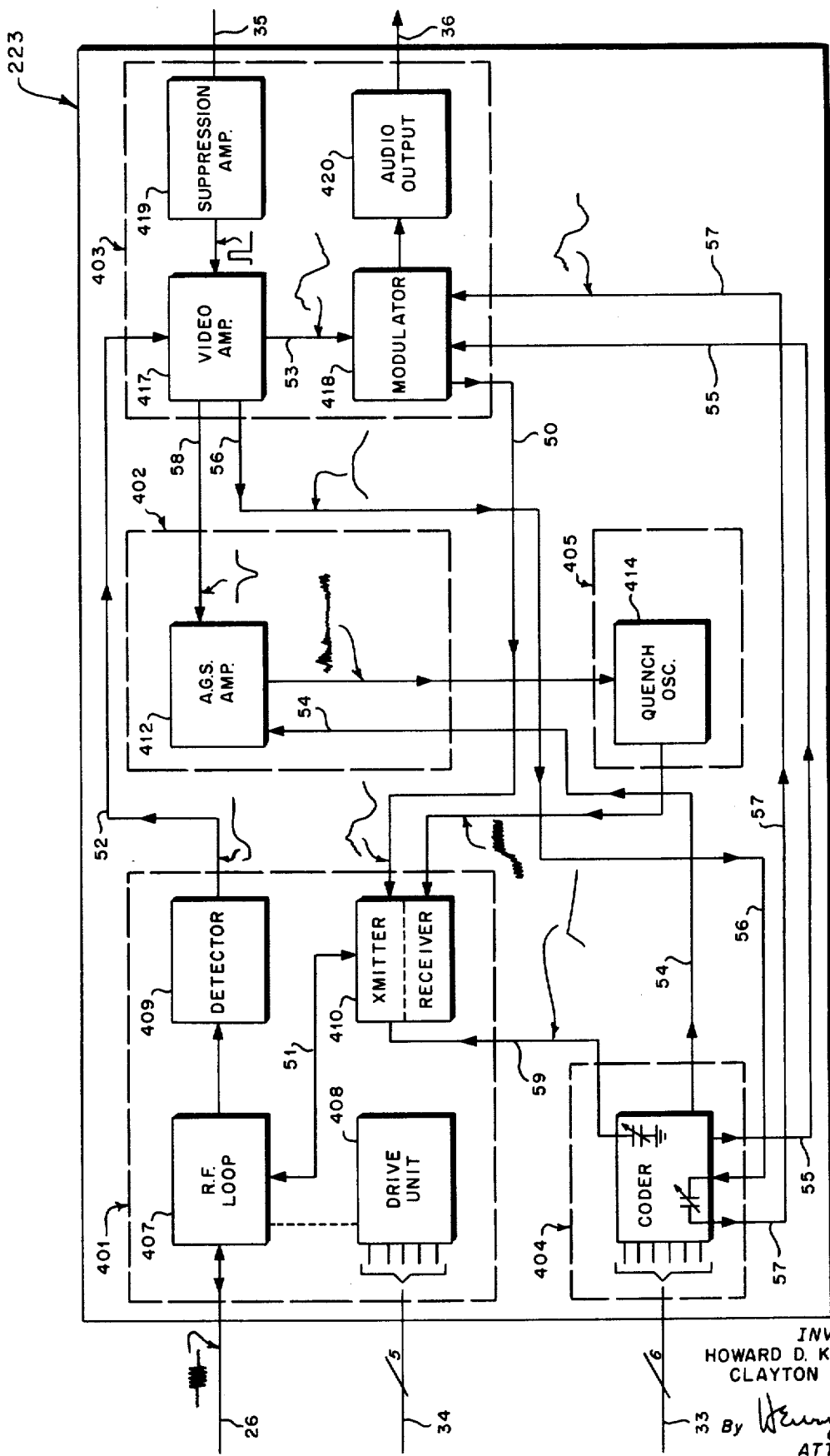
FIG. 4 illustrates in block diagram form the elements which comprise the transponder portion of the radar system.

Having described in detail the operation of the receiver-decoder unit 222 in the receive mode of operation, the construction of the transponder unit 223 will now be described with reference to FIG. 4.

In normal operation, the transponder unit 223 scans a predetermined frequency range at a particular rate in a receive condition, and transmits the coded replies only when interrogated. For example, assume that the transponder operates in the frequency range of 155 to 172 megacycles and scans this frequency range at the rate of 96 cycles per minute in the receive condition. Then an interrogating signal of sufficient strength appearing at this frequency range will cause the transponder unit to emit the preset code reply that was set by the five code switches on the control and indicator unit to be described hereinafter. A coded reply is transmitted each time the unit scans past the frequency at which the interrogating signal is present.

The transponder unit 223 is made up of five subchassis: an RF head and tuning drive chassis 401, an automatic gun stabilizer (AGS) amplifier chassis 402, a modulator chassis 403, a coder chassis 404 and a quench oscillator chassis 405.

Figure 5:
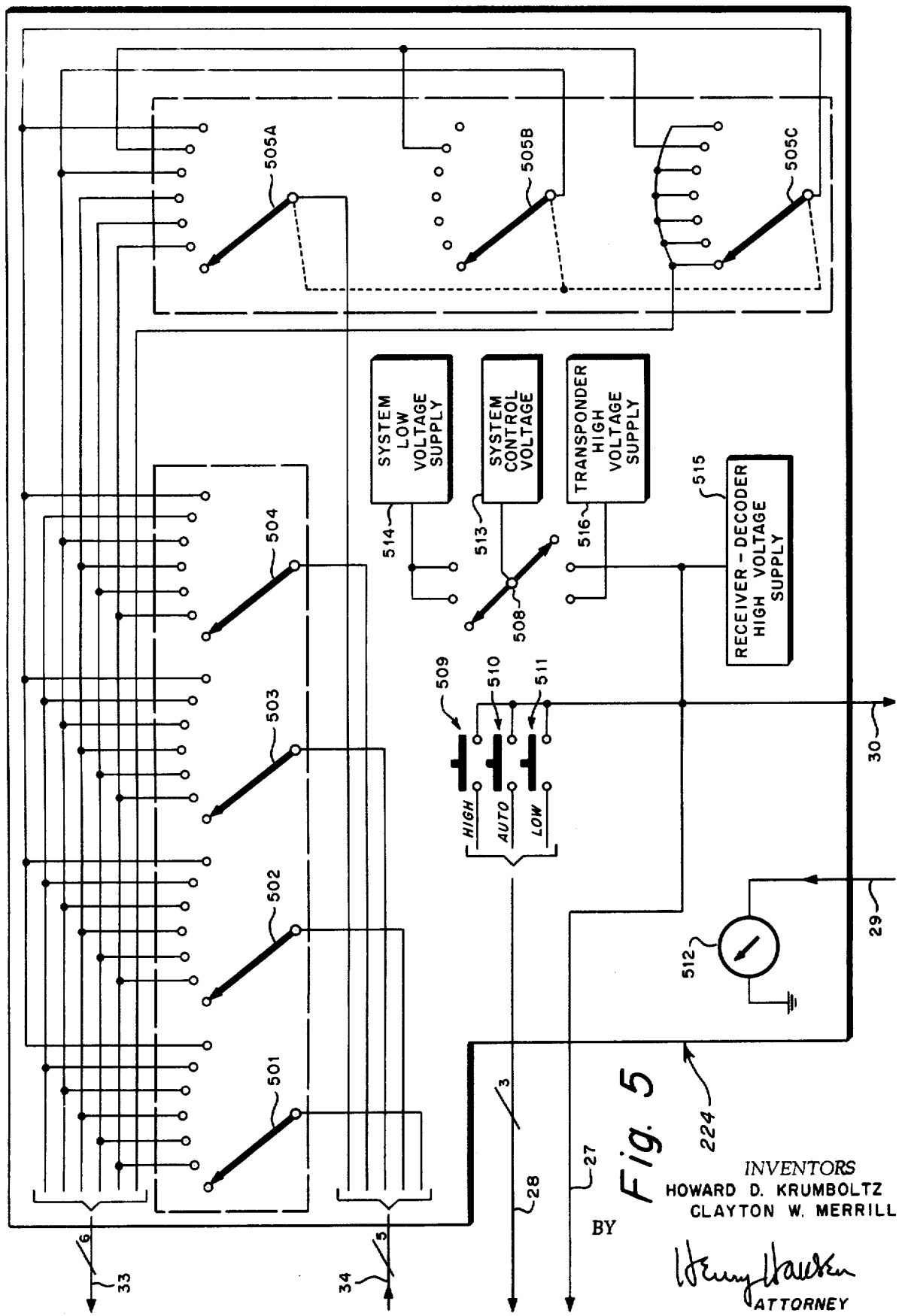
FIG. 5 is a schematic diagram of the control and indicator portion of the radar system.

The RF head and tuning drive chassis 401 comprises an RF loop 407 having an input connected to the coaxial switch 341 through conductor 26. The RF loop 407 forms a part of a super-regenerative receiver which is sweep-turned by the rotation of the RF loop inductor. The RF loop is tuned through a frequency range, for example, 155 to 172 megacycles by a motor contained in a drive unit 408. The RF loop circuit continuously searches for an interrogating signal while the motor contained in the drive unit causes the RF loop to scan the frequency range. The scan rate is adjusted by varying the voltage applied to the d.c. motor and the frequency range of the RF loop which may be adjustable by varying the frequency of the tuned circuit contained therein. During each complete scan, that is, as the frequency range of 155 to 172 megacycles is searched, one of five microswitches contained in the drive unit 408 (not shown) is mechanically actuated by a cam, for example, and closes a d.c. voltage circuit to one of the preset code switches in the control and indicator unit 224. Each of the five lines issuing from the drive unit 408 and referred to generally as conductor 34 is electrically connected to individual microswitches previously referred to and to a source of d.c. voltage. In this manner a d.c. voltage is applied through the selector switch and returned after appropriate selection, as shown in FIG. 5, to the coder 404 along conductor 33. The coder 404 is shown in greater detail in FIG. 9 and will be described hereinafter.

The super-regenerative receiver referred to above has a response characteristic which is controlled by the feedback loop consisting of a detector 409, a video amplifier 417 and a modulator 418. The super-regenerative receiver is normally biased below cut-off by the negative voltage from the output of an AGS amplifier 412 and the AC signal from a quench oscillator 414. The quench oscillator output signal is large enough on positive cycles to bring the conduction of the super-regenerative receiver to the point of oscillation at the frequency of the tuned circuit contained in the RF loop 407. If no interrogating RF signal is present at the antenna 225, or ideally, no noise in the system, the quench oscillator 414 causes the super-regenerative receiver to immediately be cut off. If on the other hand an interrogating signal has sufficient amplitude with respect to the noise level and appears at the antenna 225 within the frequency range of the tuning loop, the super-regenerative receiver oscillates on each quench cycle for which it appears. The larger the RF signal amplitude, the more quickly the oscillation begins with the duration of the oscillation determined by the signal amplitude. The output of the super-regenerative receiver is then fed to a detector 409. The detector is typically of the peak envelope type; that is, a video signal is produced on its output which is representative of the peak amplitude of the signal. Accordingly, any oscillations occurring in the tuning loop as a result of the presence of an interrogation signal are rectified in the detector and passed to a video amplifier 417 through a conductor 52 as a video input signal. The video amplifier 417 amplifies and inverts the signal and then passes it to a modulator 418 through conductor 53. The output of the modulator is coupled to a transmitter 410 through a conductor 50 with a waveform similar to that shown at the input of the transmitter 410. This signal is connected to the grid of a transmitter tube which is biased to cut off by a large negative bias voltage. If the modulator pulse reaches an amplitude sufficient to overcome this negative bias level, transmitter 410 starts oscillating. The oscillating signal appears in the loop circuit 407 through a conductor 51 and is detected by detector 409. The output of the detector is again amplified by the video amplifier 417 passed through the modulator 418 and again fed back to the grid of the transmitting tube contained in transmitter 410. In this manner, a closed loop is established and as a consequence thereof an immediate build up of signal in the RF loop many times the amplitude of an interrogating signal is generated. This signal is then coupled through the RF loop 407 through conductor 26 to the coaxial switch 341 and thence to the antenna 225.

While the pulse repetition frequency of the transmit signal appearing at the antenna 225 is determined by the interrogating signal, the pulse width of the transmit signal is determined by the time constants in the modulator and in the transmitter which have been pre-set by the code selection switches in the control and indicator unit 224 to be disclosed hereinafter.

Figure 9:
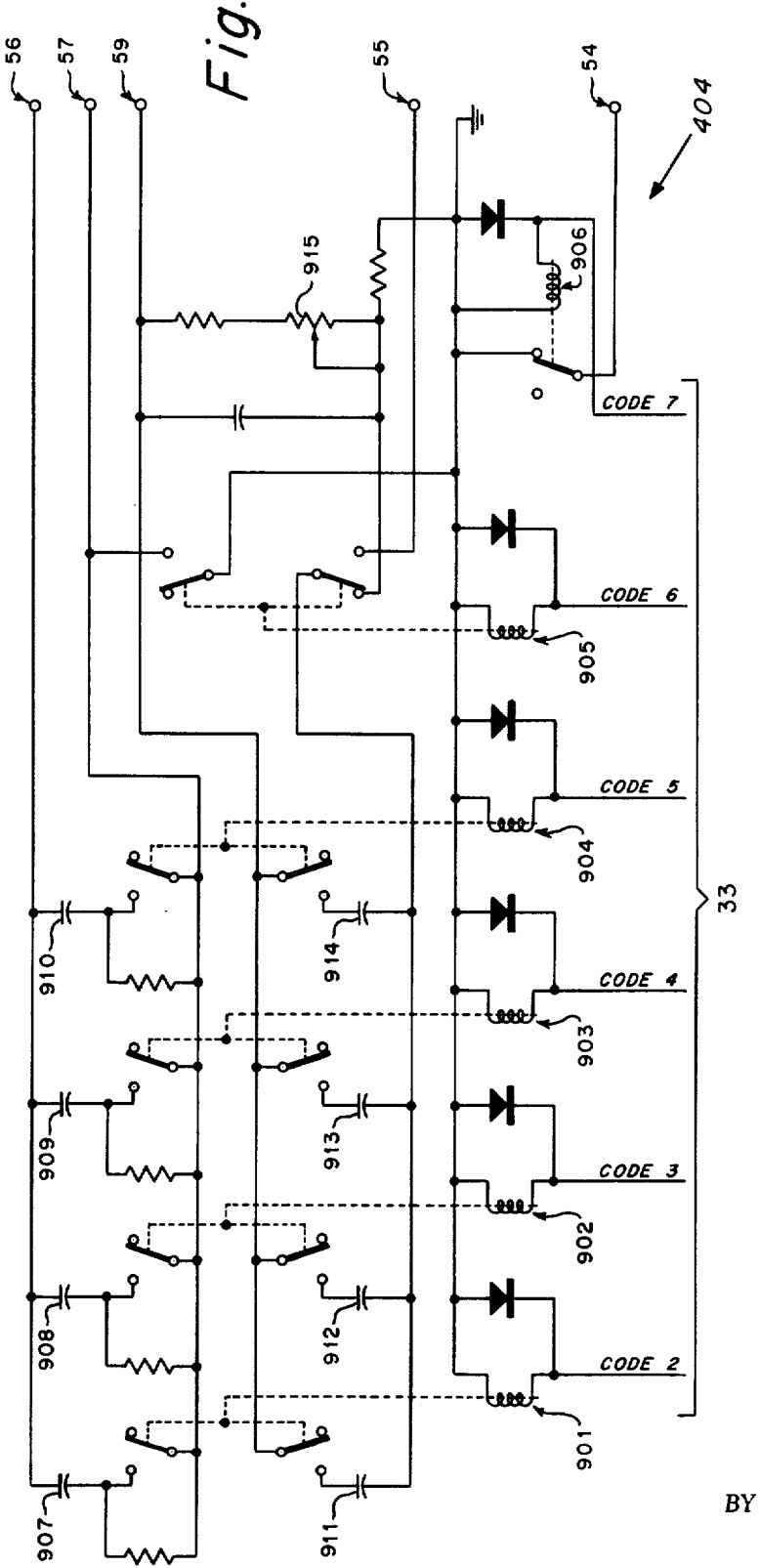
FIG. 9 is a schematic diagram of the coder circuit.

The code selection switches actuate the coder unit 404 now to be described with reference to the specific embodiment illustrated in FIG. 9. The coder illustrated herein is capable of answering interrogations in seven different codes in any combination in a group of five. The codes are determined by remote control means of the five code switches located in the control and indicator unit 224 to be described hereinafter. Relays 901 through 906 which are controlled by the code selection switches in the control and indicator unit 224 are used to select the appropriate capacitor 907 through 910 to be placed in parallel with the grid capacitor 603 to establish the desired pulse width in response to the interrogation signal. Capacitors 911 through 914 are similarly selected and are connected to the cathode of the transmitting tube to establish the width of the transmitted pulse.

Figure 10:
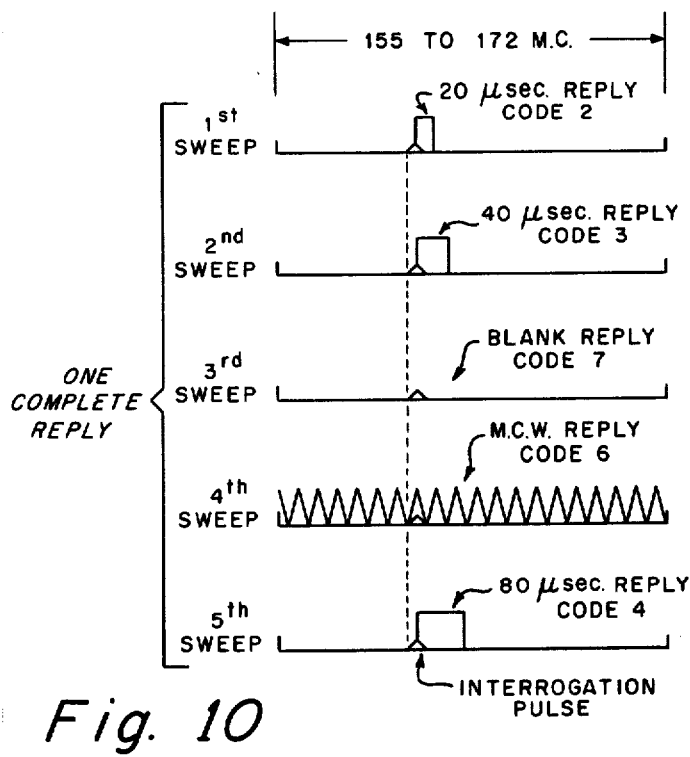
FIG. 10 illustrates typical interrogation and reply signals.

Typical interrogation signals and their reply sequence are illustrated in FIG. 10 wherein an interrogation pulse is shown to exist in each of five successive sweeps or scans of the frequency band. For example, in order to achieve a complete coded reply to interrogation pulses an interrogation signal must be received in each of five successive frequency scans. These successive scans are illustrated in FIG. 10 by the five sweeps of a frequency band of 155 to 172 megacycles. As illustrated, the coded reply signals consist of five pulse width outputs (10, 20, 40, 80 and 120 microseconds), a quench-modulated CW output (MCW), a blank or no reply, in any combination in a group of five. For example, as shown in the first sweep, a 20 microsecond reply (Code 2) is transmitted in response to an interrogation signal whereas upon the second sweep, a 40 microsecond reply (Code 3) is transmitted in response to an interrogation signal. During the third sweep a blank or no reply (Code 7) is made to the interrogation signal whereas in the fourth sweep a quench-modulated CW reply (Code 6) is made in response to the interrogation. Similarly, on the fifth sweep a reply of 80 microseconds (Code 4) is made to the interrogation signal. This would represent a coded reply of 2-3-7-6-4.

It is to be understood that the above referred to pulse widths or code replies are merely for illustration of the specific embodiment and are not meant to be by way of limitation.

Figure 6:
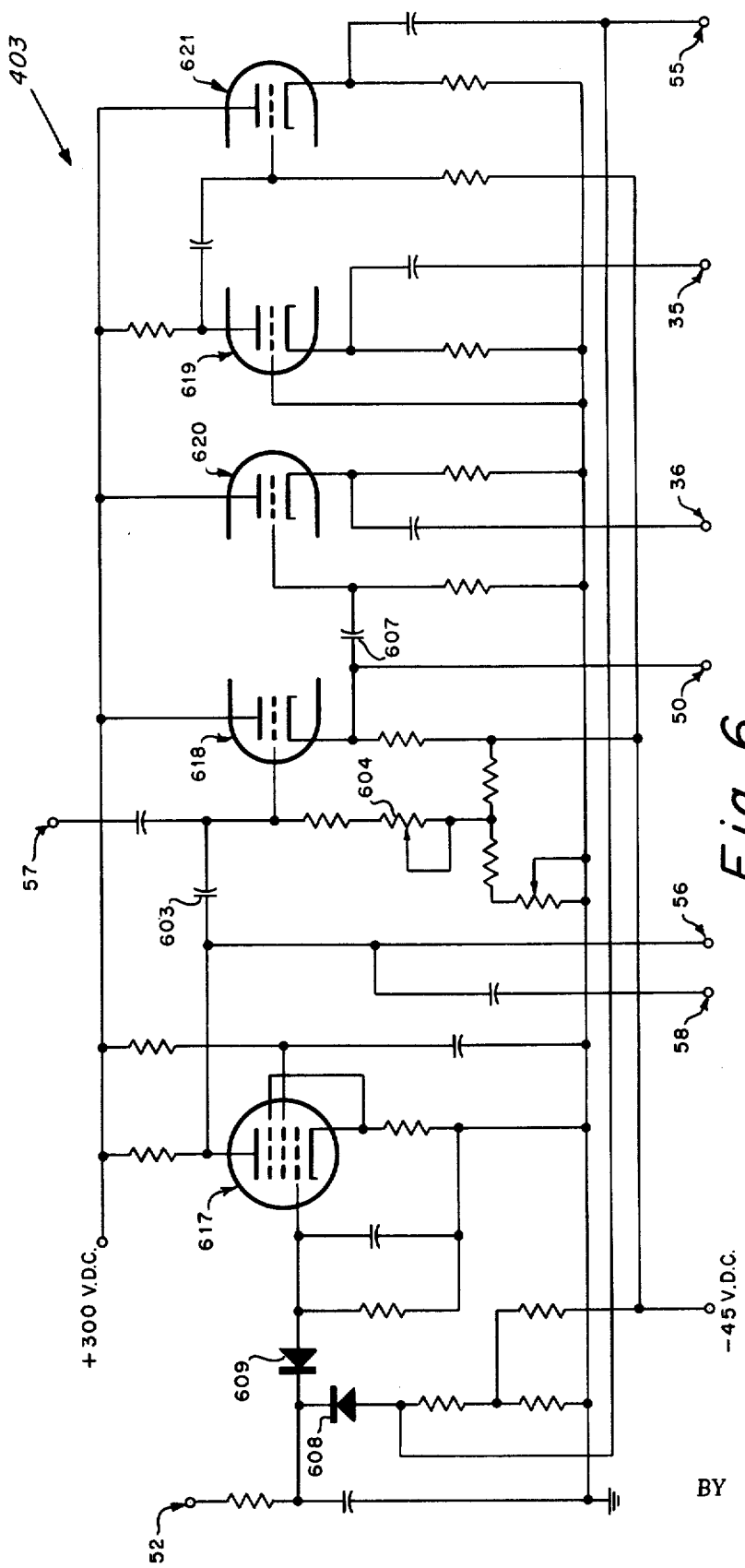
FIG. 6 is a schematic diagram of the modulator portion of the transponder.

Having described the basic construction and operation of the transponder unit, a specific illustration of the circuitry necessary to achieve these results will now be described in greater detail with reference to FIGS. 4, 6 and 9.

Upon receiving a signal from the RF loop 407 and the subsequent detection by detector 409, the negative signal from the detector is fed to the modulator chassis 403 which contains the video amplifier 417, the modulator 418, a suppression amplifier 419 and an audio amplifier 420 to be described hereinafter with reference to FIG. 6.

The detected signal from detector 409 is coupled to the grid of a video amplifier tube 617 (shown in FIG. 6) through appropriate circuitry as illustrated so as to provide an output from the plate circuit of an amplified and inverted signal. This signal is coupled to the grid of a modulator tube 618 through a capacitor 603. The modulator tube 618 functions as a cathode follower-modulator with the cathode coupled directly through the conductor 50 to the grid of the transmitting tube contained in unit 410 thereby providing bias as well as the positive going driving signal as illustrated in FIG. 4. The width of this positive signal is determined by components in the cathode circuit of the transmitting tube as well as components in the grid circuit of the modulating tube 618. To form the various pulse widths desired in the system, the grid coupling capacitor 603 is paralleled with one of the capacitors in the coder unit contained in the coder chassis 404, to be described hereinafter. The particular capacitor which is placed in parallel with capacitor 603 is dependent upon the desired code of the transmit signal.

A potentiometer 604 is the squitter (sensitivity) control and when used in conjunction with potentiometer 915 contained in the coder unit permits squitter rate adjustment from 0 to approximately 5,000 pulses per second.

The cathode of the modulator tube 618 is also coupled to an audio amplifier tube 620 through a capacitor 607. The output from the cathode of audio amplifier tube 620 is coupled to the aircraft warning system 220 on the aircraft as an audio monitor signal to indicate when the transponder unit is transmitting or being interrogated. A suppression circuit 619 is incorporated for preventing the transponder from erroneously transmitting signals as a result of spurious signals from radar or other equipment in the aircraft system. The suppression is achieved by applying a pulse to the input of the suppression amplifier from the ship's system. The pulse is amplified in the suppression amplifier 619 and coupled to a cathode follower 621 as a positive-going pulse; this signal is fed back to the anode of a diode 608 which in conjunction with a diode 609 operate as a coincident circuit. Video signals appearing at the junction of diode 608 and 609, coincident in time with the suppression pulse, will not reach the grid of video amplifier 617. Diode 608 conducts heavily at this time, thus preventing the signal from appearing on the grid of video amplifier 617 thereby disabling the transmitter loop.

The automatic gain stabilizer amplifier (AGS) 412 receives ambient noise voltages from the RF circuitry contained in the RF loop 407 through the detector 409 and the video amplifier 417 through a conductor 58 and generates a bias voltage to maintain a constant receiver sensitivity over the tunable range. The noise signals are amplified and passed through a bandpass filter (not shown), for example, having 6 db points between 50 and 150 kc, respectively. This filter desensitizes the AGS amplifier 412 to residual quench oscillation and transmitter pulse signals, thereby minimizing their effects on the AGS bias. The output of the bandpass filter is amplified again and rectified. The output is then a d.c. voltage with amplitude varying directly as a function of the receiver noise level as illustrated in FIG. 4. This output voltage is applied to the quench oscillator 414 where it is combined with the quench signal and then applied to the grid of the receiver contained in the transmitter-receiver unit 410. In this manner, a closed negative feedback loop is created in which as the receiver noise signal rises, the bias increases at the grid of the receiver tube thereby decreasing the receiver sensitivity. By this means the system automatically balances at some receiver sensitivity level.

As described previously, the purpose of the quench oscillator 414 is to maintain the receiver portion of the RF head and tuning drive unit 401 in a transient state of oscillation. By quenching receiver oscillations before the receiver tube saturates, it is possible to perpetuate a condition of intermittent receptivity. The quench voltage is superimposed with the negative d.c. bias voltage of the AGS amplifier and applied to the grid of the receiver tube which is normally biased below cut-off. As described previously, the quench oscillator signal with the superimposed AGS signal is large enough on positive cycles to bring the grid of the receiver tube to the point of oscillation at the frequency of the tuned circuit. If no interrogating RF signal is present at the antenna 225 or ideally, no noise in the system, the quench oscillator takes the grid of the receiver tube immediately back to cut-off. If, on the other hand, an interrogating RF signal has sufficient amplitude to overcome the noise level and appears at the antenna at the same frequency as that of the RF turning loop, the receiver oscillates on each quench cycle for which it appears.

In an example of typical operation then, the transponder unit 223 scans the frequency range of 155 to 172 megacycles at a rate of 96 cycles per minute in a receive condition and transmits the coded replies only when interrogated. An interrogating signal of sufficient strength appearing in this frequency range will cause transponder to emit the preset code reply that has been set by the five code selection switches on the control and indicator unit 224 to be described hereinafter. A coded reply is transmitted each time the unit scans past the frequency at which the interrogating signal is present. The super-regenerative receiver is sweep-tuned by the rotation of the RF loop inductor. The response characteristic of the super-regenerative receiver is controlled by the feedback loop consisting of the detector 409, the video amplifier 417 and the modulator 418. If an interrogating signal appears at the antenna within the transponder tunable range, it is received, amplified and sent to the detector which is common to the loop circuit. The output of the detector is a negative pulse, its amplitude representative of the incoming antenna signal. The detector output is fed to the video amplifier 417 and is amplified and inverted. This signal is then fed to the modulator 418 having an output which is directly connected to the transmitting tube control grid. This signal has a negative bias level sufficient to hold the transmitter in the cut-off state. If, however, the incoming signal reaches an amplitude to overcome this bias level, the transmitter will start to oscillate. The oscillation will then appear in the loop circuit and be detected whereupon the output is again amplified and presented to the grid of the transmitter. A closed loop is then established and there is an immediate buildup of RF signal in the RF loop many times the amplitude of the interrogating signal. The signal is then transmitted via the antenna 225 with the pulse repetition frequency determined by the interrogating signal and the pulse width determined by the time constants in the modulator and the cathode circuit as described above. If for some reason the interrogating signal has a pulse repetition frequency greater than that to which the responder can reply, the unit will count down and only reply within its recovery rate. If more than one interrogating signal appears in the scanned frequency range, the transponder will emit the coded reply for each respective interrogation signal provided it does not interfere with the previous pulse width reply.

In the squitter mode of operation, the transponder scans the frequency range and is adjusted to transmit the coded reply when triggered, not necessarily by the interrogating signal, but by any surrounding noise received having sufficient amplitude. This causes a reply signal at a pulse repetition frequency mainly determined by the recovery rate of the transmitter. It also may lock-in with interrogation signals present in the noise, provided these signals are at or slightly above the transponder's natural pulse repetition frequency.

The control and indicator unit 24 illustrated in FIG. 5 contains most of the operating controls for the system. Code selector switches 501 through 505 are used to select the desired code in the manner described above. Each selector switch has seven positions which are indicative of the seven types of replies available within the particular system. As can be seen, a large variety of combinations of replies is readily available to the operator so that he may duplicate the response signal as decoded by the receiver-decoder unit 222.

A switch 508 controls the main power to the entire system, and as illustrated, no power is being applied to the system. As switch 508 is rotated from position 1 (OFF position) to position 2 (Receive Mode), a low voltage supply system 514 and a receiver-decoder high voltage supply system 515 is energized by a system control voltage 513. Rotation into the third position (Transmit Mode) applies high voltage to the transponder 223 from a transponder high voltage supply 516 and the receiver-decoder high voltage supply 515 is disabled thereby permitting operation of only one mode at a time.

Relay switches 509, 510 and 511 are connected to relay 48 in the receiver decoder unit through conductor 28 and operate the relays contained therein in such a manner so that by momentarily depressing switch 509 or switch 511 the automatic scan will stop. With either switch 509 or 511 depressed, the motor tunes toward the high or low end of the tuning range respectively. Upon depressing switch 510 the motor is placed in an automatic scanning mode so that the frequency band is automatically scanned.

A meter 512, connected to potentiometer 49 through conductor 29, is calibrated in megacycles and provides a continuous indication to the operator of the frequency scan range in the Receive Mode of operation.

Having thus described the elements in a specific embodiment of the present invention, the overall operation of the system will now be described with reference to FIG. 1 and FIG. 2.

An aircraft 113 equipped with an ECM radar system 221 is flown into enemy territory having an interrogation station 111 which is interrogating a friendly aircraft 112. The aircraft 112 responds with a proper coded reply thereby identifying itself as a friendly aircraft. The ECM radar system in aircraft 113 is operating in the Receive Mode and accordingly as previously described, is scanning the frequency band for the responsive signal. Upon receiving the response, the signal is decoded and displayed on indicator lights for an operator who then selects the identical code on the code selection switches. The system is then transferred to the Transmit Mode of operation in which the transponder 223 searches the frequency band for the interrogation signal from the interrogation station 111 and upon receipt thereof transmits the preset coded response to the interrogation station which then identifies aircraft 113 as friendly to the environment. Having thus deceived the interrogator, aircraft 113 is permitted to continue into the enemy territory without incidence.

Obviously, many modifications and variations of the present invention are possible in light of the above teachings. It is therefore to be understood, that within the scope of the appended claims, the invention may be practiced otherwise than as specifically described.

What is claimed is:

1. An airborne electronic countermeasures systems for intercepting and imitating responding IFF signals from aircraft identified as friendly by an interrogator, said system comprising:
    a receiver-decoder means for receiving and decoding responding IFF signals from said aircraft, said receiver-decoder means including means for inhibiting and decoding of received signals having a pulse width less than a selected amount;
    control means (coupled and responsive to said receiver-decoder means) for selecting a code similar to that of said decoded IFF signal; and
    transponder means coupled to said control means for receiving interrogation signals from said interrogator and for transmitting (coded signals) the selected code in response to said interrogation signals, thereby imitating responding IFF signals from said aircraft.

2. An airborne electronic countermeasures system as recited in claim 1 wherein said transponder means further comprises:
    tuning means for scanning a frequency band for the presence of said interrogation signals;
    electrical means coupled to said tuning means for receiving and amplifying said interrogation signals;
    coder means responsive to said control means and operatively connected to said electrical means for determining the code of said coded signals; and
    transmitter means coupled to said tuning means and responsive to said coder means and to said electrical means for transmitting said coded signals in response to said interrogation signals.

3. An airborne electronic countermeasures system as recited in claim 2 wherein said electrical means comprises:
    detector means coupled to said tuning means for detecting the presence of said interrogation signals;
    amplifier means coupled to said detector means for amplifying the detected interrogation signals;
    modulator means responsive to said amplifier means and coupled to said transmitter means and said coder means for controlling the operation of said transmitter means;
    said detector means, amplifier means and modulator means forming a feedback loop with said transmitter means for initiating operation of the said transmitter means in response to said interrogation signals by causing an immediate build-up of signals in said feedback loop many times the amplitude of said interrogation signals, thereby causing said transmitter means to transmit a signal with a pulse repetition frequency determined by said interrogating signals and the pulse widths determined by said coder means.

4. An airborne electronic countermeasure system as recited in claim 2 wherein said coder means comprises:
    a plurality of switching means connected to said control means; and
    means operatively connected with said plurality of switching means for determining the code of said coded signals in accordance with the selected code from said control means.

5. An airborne electronic countermeasure system for intercepting and imitating responding IFF signals from aircraft identified as friendly by an interrogator, said system comprising:
    a receiver-decoder means for receiving and decoding responding IFF signals from said aircraft, said receiver-decoder means including:
        scanning means for searching a frequency band for said responding IFF signals;
        circuit means coupled to said scanning means for amplifying and detecting said responding IFF signals, thereby forming detected pulses having envelopes similar to said responding IFF signals;
        discriminator means coupled to said circuit means for rejecting said detected pulses narrower than a selected pulse width and differentiating said detected pulses greater than said selected pulse width, thereby forming positive and negative pulse portions;
        selector means coupled to said discriminator means for separating said positive and negative pulse portions; (and)
        decoder means coupled to said selector means for decoding said positive and negative pulse portions and for identifying said responding IFF signals;
    control means for selecting a code similar to that of said decoded IFF signal; and
    transponder means coupled to said control means for receiving interrogation signals from said interrogator and for transmitting the selected code in response to said interrogation signals, thereby imitating responding IFF signals from said aircraft.

6. An airborne electronic countermeasures system as recited in claim 5 wherein said transponder means further comprises:
    tuning means for scanning said frequency band for the presence of said interrogation signals;
    electrical means coupled to said tuning means for receiving and amplifying said interrogation signals;
    coder means responsive to said control means and operatively connected to said electrical means for determining the code of said coded signals; and
    transmitter means coupled to said tuning means and responsive to said coder means and said electrical means for transmitting said coded signals in response to said interrogation signals.

7. An electronic countermeasures system as recited in claim 6 wherein said electrical means further comprises:
    detector means coupled to said tuning means for detecting the presence of said interrogation signals;
    amplifier means coupled to said detector means for amplifying the detected interrogation signals;
    modulator means responsive to said amplifier means and coupled to said transmitter means and said coder means for controlling the operation of said transmitter means;

said detector means, said amplifier means and said modulator means forming a feedback loop with said transmitter means for initiating operation of said transmitter means in response to said interrogation signals by causing an immediate build-up signals in said feedback loop many times the amplitude of said interrogation signals, thereby causing said transmitter means to transmit a signal with a pulse repetition frequency determined by said interrogating signals and the pulse widths determined by said coder means.

8. An airborne electronic countermeasure system as recited in claim 6 wherein said coder means comprises:
a plurality of switching means connected to said control means; and
means operatively connected with said plurality of switching means for determining the code of said coded signals in accordance with the selected code from said control means.

9. An electronic countermeasure system as recited in claim 5 wherein said discriminator means comprises:
input means coupled to said circuit means for receiving said detected pulses;
delay means coupled to said circuit means of receiving said detected pulses and for delaying said detected pulses a selected amount of time;
coincidence means coupled to said input means and to said delayed detected pulses for generating a coincidence pulse having a width equal to the coincidence time of said pulses; and
pulse forming means coupled to the output of said coincidence means for differentiating said coincidence pulse and for generating positive and negative pulse portions.

10. An airborne electronic countermeasure system as recited in claim 5 wherein said decoder means comprises:
a plurality of generator means each having an input and first and second outputs, the input of a first generator means connected to said selector means and the inputs of the other of said plurality of generator means connected to the first outputs of a preceding generator means in a series relationship;
a coincidence bus means connected to the second outputs of said plurality of generator means;
a plurality of multivibrator means each having an input connected to said coincidence bus means;
a plurality of indicator means operatively coupled to the outputs of said plurality of multivibrator means for causing said indicator means to display said decoded IFF signals.

11. An airborne electronic countermeasure system operating in a hostile IFF environment for deceiving a hostile interrogator into identifying an aircraft equipped with said system as friendly to said environment, said system comprising:
receiver-decoder means for receiving and decoding a responding IFF radio frequency signal from an aircraft friendly to said interrogator, said receiver-decoder means including:
scanning means for searching a frequency band for said responding IFF signals;
circuit means coupled to said scanning means for amplifying and detecting said responding IFF signals, thereby forming detected pulses having envelopes similar to said responding IFF signals;
discriminator means couples to said circuit means for rejecting said detected pulses narrower than a selected pulse width and differentiating said detected pulses greater than said selected pulse width, thereby forming positive and negative pulse portions;
selector means coupled to said discriminator means for separating said positive and negative pulse portions: (and)
decoder means coupled to said selector means for decoding said positive and negative pulse portions and for identifying said responding IFF signals;
control means for selecting a code substantially similar to that of the responding aircraft; and
transponder means coupled to said control means for receiving interrogation signals from said interrogator, and for transmitting said selected code in response to said interrogation signals thereby causing said interrogator to identify said selected code as emanating from a friendly aircraft.

12. An airborne electronic countermeasure system as recited in claim 11 wherein said transponder means comprises:
tuning means for scanning a frequency band for the presence of said interrogation signals;
electrical means coupled to said tuning means for receiving and amplifying said interrogation signals;
coder means responsive to said control means and operatively connected to said electrical means for determining the code of said coded signals; and
transmitter means coupled to said tuning means and responsive to said coder means and to said electrical means for transmitting said coded signals in response to said interrogation signals.

13. An airborne electronic countermeasure system as recited in claim 12 wherein said control means comprises:
means for providing a plurality of sequential signals; and
a plurality of code lines selectively engageable to said plurality of sequential signals for establishing a coded signal to control said coder means.

14. An airborne electronic countermeasure system for receiving and decoding radio frequency signals in a frequency band and transmitting decoded signals in reply to an interrogation, said system comprising:
a ground-based interrogator means;
a first aircraft friendly to said interrogator means having means for receiving interrogation signals from said interrogator means and responder means for transmitting to said interrogator means coded signals for identifying itself;
a second aircraft having means for intercepting and imitating said coded signals; and
means within said second aircraft for transmitting reply signals to said interrogator means in response to said interrogation signals from said interrogator means, said reply signals having characteristics similar to said coded signals from said first aircraft, thereby causing said second aircraft to be identified as friendly in a hostile environment.

15. An airborne electronic countermeasure system as recited in claim 14 wherein said means for intercepting and initiating comprises:

scanning means for searching said frequency band for said coded signals;

circuit means coupled to said scanning means for amplifying and detecting said coded signals, thereby forming detected pulses having envelopes similar to said coded signals;

discriminator means coupled to said circuit means for rejecting said detected pulses narrower than a selected pulse width and differentiating said detected pulses greater than a selected pulse width, thereby forming positive and negative pulse portions;

selector means coupled to said discriminator means for separating said positive and negative pulse portions;

decoder means coupled to said selector means for decoding said positive and negative pulse portions, thereby identifying and displaying the code of said coded signals;

means actuated by said scanning means for generating a plurality of sequential signals; and a plurality of code lines selectively engageable in accordance with the displayed code for establishing the code of said reply signals.

16. An airborne electronic countermeasure system as recited in claim 15 wherein said means within said second aircraft comprises:

tuning means for scanning said frequency band for the presence of said interrogation signals;

electrical means coupled to said tuning means for receiving and amplifying said interrogation signals; and transmitter means coupled to said tuning means and responsive to said plurality of code lines for transmitting said reply signals to said interrogator means.

* * * * *

UNITED STATES PATENT OFFICE
CERTIFICATE OF CORRECTION

Patent No. 3,905,035      Dated September 9, 1975

Inventor(s) Howard D. Krumboltz and Clayton W. Merrill

It is certified that error appears in the above-identified patent and that said Letters Patent are hereby corrected as shown below:

Column 15, lines 26 and 27, delete "(coupled and responsive to said receiver-decoder means)".

Column 15, line 31, delete "(coded signals)".

Column 16, line 33, delete "(and)".

Column 17, line 26, "of" should read -- for --.

Column 18, line 3, "couples" should read -- coupled --.

Column 18, line 11, change ":" to -- ; -- and delete "(and)".

Signed and Sealed this twenty-seventh Day of January 1976

[SEAL]

Attest:

RUTH C. MASON  
*Attesting Officer*

C. MARSHALL DANN  
*Commissioner of Patents and Trademarks*

UNITED STATES PATENT OFFICE
CERTIFICATE OF CORRECTION

Patent No. 3,905,035   Dated September 9, 1975

Inventor(s) Howard D. Krumboltz and Clayton W. Merrill

It is certified that error appears in the above-identified patent and that said Letters Patent are hereby corrected as shown below:

Column 15, lines 26 and 27, delete "(coupled and responsive to said receiver-decoder means)".

Column 15, line 31, delete "(coded signals)".

Column 16, line 33, delete "(and)".

Column 18, line 11, change ":" to -- ; -- and delete "(and)".

Signed and Sealed this sixth Day of April 1976

[SEAL]

Attest:

RUTH C. MASON
Attesting Officer

C. MARSHALL DANN
Commissioner of Patents and Trademarks